(12) United States Patent
Byxbe

(10) Patent No.: US 11,443,638 B2
(45) Date of Patent: Sep. 13, 2022

(54) VISUALIZATION FOR REAL-TIME POSITION MONITORING IN FORMATION FLYING

(71) Applicant: Rockwell Collins, Inc., Cedar Rapids, IA (US)

(72) Inventor: Valerie R. Byxbe, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/871,892

(22) Filed: May 11, 2020

(65) Prior Publication Data
US 2021/0350712 A1 Nov. 11, 2021

(51) Int. Cl.
*G08G 5/00* (2006.01)

(52) U.S. Cl.
CPC ......... *G08G 5/0008* (2013.01); *G08G 5/0021* (2013.01); *G08G 5/0078* (2013.01)

(58) Field of Classification Search
CPC ... G08G 5/0008; G08G 5/0021; G08G 5/0078
See application file for complete search history.

(56) References Cited

U.S. PATENT DOCUMENTS

| | | | |
|---|---|---|---|
| 5,992,065 A * | 11/1999 | Preiser | G09F 21/16 40/212 |
| 6,271,768 B1 * | 8/2001 | Frazier, Jr. | G08G 5/0021 340/961 |
| 6,911,936 B2 | 6/2005 | Stayton et al. | |
| 6,963,795 B2 | 11/2005 | Haissig et al. | |
| 9,355,564 B1 | 5/2016 | Tyson et al. | |
| 10,203,690 B2 | 2/2019 | Harada et al. | |
| 2002/0011950 A1 | 1/2002 | Frazier et al. | |
| 2003/0137444 A1 | 7/2003 | Stone et al. | |
| 2010/0117867 A1 * | 5/2010 | He | G01C 23/00 340/974 |
| 2011/0193725 A1 | 8/2011 | Wise et al. | |
| 2017/0364068 A1 * | 12/2017 | Harada | G05D 1/0044 |
| 2018/0074520 A1 * | 3/2018 | Liu | G08G 5/0052 |

(Continued)

FOREIGN PATENT DOCUMENTS

| | | |
|---|---|---|
| EP | 1552355 A1 | 1/2004 |
| EP | 2666150 B1 | 3/2019 |

OTHER PUBLICATIONS

Extended Search Report for European Application No. 21169859.2 dated Nov. 4, 2021, 9 pages.

*Primary Examiner* — Thomas Ingram
(74) *Attorney, Agent, or Firm* — Suiter Swantz pc llo

(57) ABSTRACT

A formation monitoring system for a plurality of aircraft flying in formation is disclosed. The system includes a display for a leader aircraft configured to display a current position of one or more aircraft of the plurality of aircraft. The system further includes a controller for the leader aircraft configured to at least one of receive a current position signal from one or more aircraft of the plurality of aircraft, calculate the current position of the one or more aircraft of the plurality of aircraft, or calculate a target position of the one or more aircraft of the plurality of aircraft. The system further includes a transmitter configured to transmit the target position signal to the one or more aircraft of the plurality of aircraft.

10 Claims, 5 Drawing Sheets

(56) References Cited

U.S. PATENT DOCUMENTS

2019/0371187 A1* 12/2019 Moravek ................ B64D 45/04
2020/0301442 A1*  9/2020 Umeda ................ G05D 1/0287
2021/0294351 A1*  9/2021 Wiberg ................ G05D 1/0295

* cited by examiner

VISUALIZATION FOR REAL-TIME POSITION MONITORING IN FORMATION FLYING

BACKGROUND

Formation flying, also known as station keeping, is the coordinated flight of two or more aircraft. In military aviation, the aircraft flying in formation are typically under the command of a flight leader. The flight leader may command the aircraft to fly in various formations depending on the situation and/or flight conditions. For example, the flight leader may command multiple aircraft to form a compact formation in order to concentrate firepower. Multiple flight formations or changes within a flight formation may be made on a single flight, all directed by the flight leader.

Competent formation flying requires that the flight leader have real-time knowledge of each aircraft in formation. A flight leader may determine the position of an aircraft in formation through direct visualization or through radio communication with the crew of the other aircraft in the formation. This becomes difficult when the flight leader is blocked from seeing one or more aircraft in the formation or when radio communication between aircraft is inconsistent, preventing an aircraft communicating to the flight leader that a request flight formation change has been made. Thus, it is desirable to provide a system that avoids the shortcomings of conventional approaches.

SUMMARY

A formation monitoring system for an aircraft of a plurality of aircraft flying in formation is disclosed. In one or more embodiments, the system includes a display configured to display a current position of at least one aircraft of the plurality of aircraft. In one or more embodiments, the system includes a controller configured to receive a position signal from the at least one aircraft of the plurality of aircraft. In one or more embodiments, the controller is further configured to calculate the relative position of the at least one aircraft of the plurality of aircraft; wherein the relative positions of the one or more aircraft of the plurality of aircraft are displayed on the display.

In some embodiments of the system, the system further includes an aircraft selector configured to select one or more aircraft of the plurality of aircraft displayed on the display. In one or more embodiments, the system further includes a target position selector configured to select a target position on the display for the one or more aircraft selected by the aircraft selector. In one or more embodiments of the disclosure, the system further includes a transmitter configured to transmit the target position to the one or more aircraft of the plurality of aircraft.

In some embodiments of the system, the controller is further configured to receive a target position from one or more aircraft of the plurality of aircraft, wherein the target position from the one or more aircraft of the plurality of aircraft is displayed on the display.

In some embodiments of the system, the display is further configured to differentially display at least one of a lead aircraft or an ownship from the plurality of In some embodiments of the system, the display is further configured to differentially display the current position of the at least one aircraft of the plurality of aircraft from a target position of the at least one aircraft of the plurality of aircraft.

In some embodiments of the system, the display is further configured to indicate when the one or more aircraft of the plurality of aircraft have moved to a target position.

In some embodiments of the system, the display is further configured to indicate when all aircraft of the plurality of aircraft are in a target position.

In some embodiments of the system, the display is further configured to indicate a path from the current position of or more or the plurality of aircraft to a target position of the one or more of the plurality of aircraft.

In some embodiments of the system, the display is further configured to display an approximation of the flight formation.

In some embodiments of the system, the display is configured as a portion of a primary flight display.

A formation monitoring system for a plurality of aircraft flying in formation is also disclosed. In one or more embodiments, the system includes a lead display for a leader aircraft of the plurality of aircraft configured to display a current position of one or more aircraft of the plurality of aircraft. In one or more embodiments, the system further includes an aircraft selector for the leader aircraft of the plurality of aircraft configured to select the one or more aircraft of the plurality of aircraft displayed on the lead display. In one or more embodiments, the system further includes a target position selector for the leader aircraft of the plurality of aircraft configured to select a target position on the lead display for the one or more aircraft of the plurality of aircraft selected by the aircraft selector. In one or more embodiments, the system further includes a lead controller for the leader aircraft of the plurality of aircraft configured to at least one of receive a current position signal from the one or more aircraft of the plurality of aircraft, calculate the current position of the one or more aircraft of the plurality of aircraft; wherein the current position of the one or more aircraft of the plurality of aircraft are displayed on the lead display, or calculate the target position of the one or more aircraft of the plurality of aircraft, wherein the relative positions of the target positions of the one or more aircraft of the plurality of aircraft are displayed on the lead display. In one or more embodiments, the system further includes a transmitter configured to transmit the target position signal to the one or more aircraft of the plurality of aircraft.

In some embodiments of the system, the system further comprises a follow display for one or more follower aircraft of the plurality of aircraft. In one or more embodiments, the system further includes a follow controller for the one or more follower aircraft of the plurality of aircraft configured to at least one of receive the current position signal from the one or more aircraft of the plurality of aircraft, receive the target position signal from the leader aircraft, calculate the current position of the one or more aircraft of the plurality of aircraft; wherein the current position of the one or more aircraft of the plurality of aircraft are displayed on the follow display, or calculate the target position of the one or more aircraft of the plurality of aircraft, wherein the relative positions of the target positions of the one or more aircraft of the plurality of aircraft are displayed on the follow display.

In some embodiments of the system, the display is further configured to differentially display at least one of the leader aircraft or an ownship from the plurality of aircraft.

In some embodiments of the system, the follow display is further configured to differentially display the current position of the one or more follower aircraft of the plurality of aircraft and the target position of the one or more follower aircraft of the plurality of aircraft.

In some embodiments of the system, the follow display is further configured to differentially display the current position of the one or more follower aircraft of the plurality of aircraft and the target position of the one or more follower aircraft of the plurality of aircraft.

In some embodiments of the system, the lead display is configured as a portion of a primary flight display.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
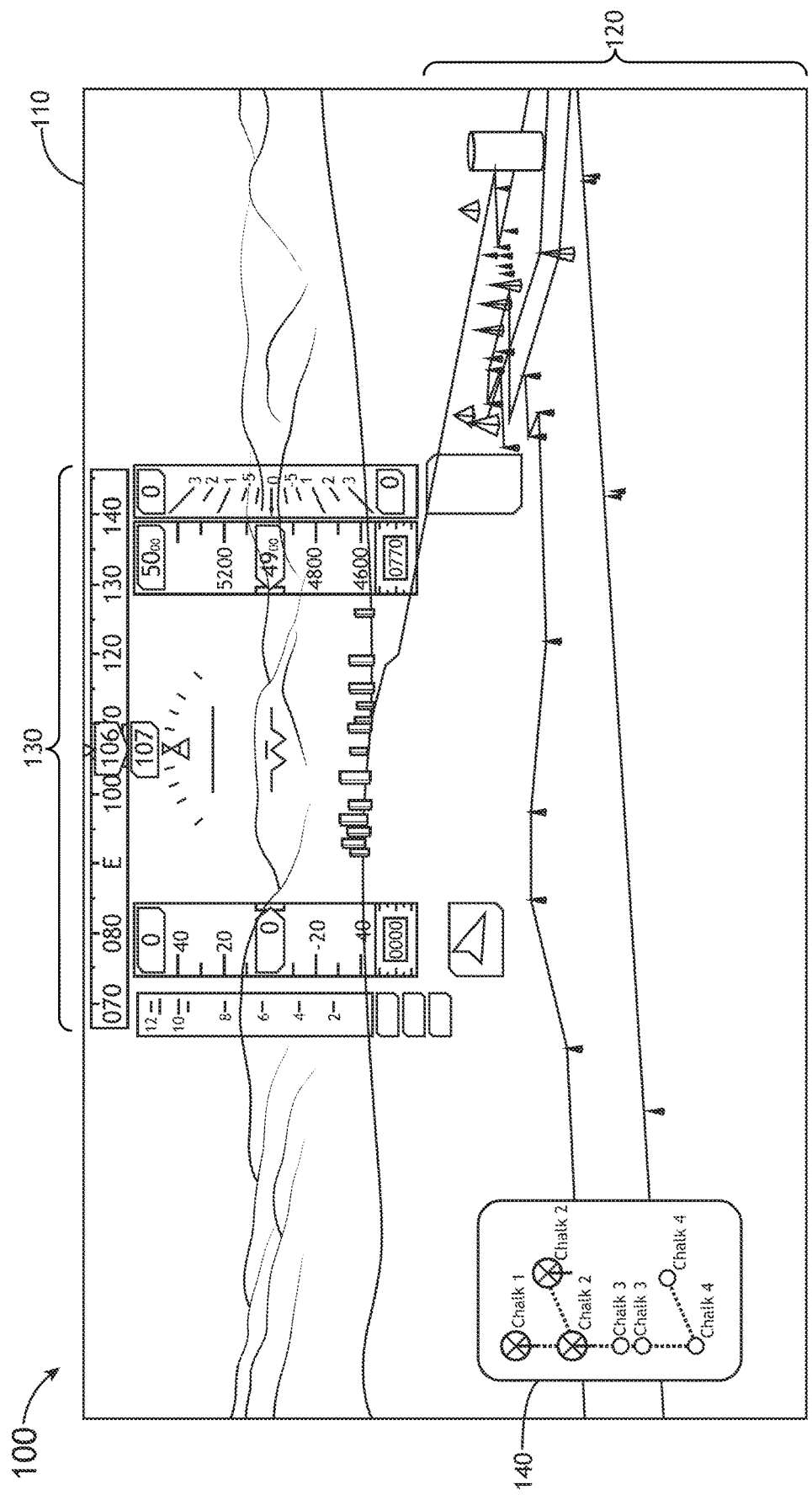
FIG. 1 is a diagram illustrating an example environment of an aircraft display that includes a formation display, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the concepts disclosed herein are directed to a formation monitoring system for aircraft. Formation flying is a coordination of flight between two or more aircraft commonly used in military combat and training situations. Multiple formations may be formed during flight depending upon the tactical demands of the combat environment. Multiple changes within a single formation may also be made (e.g., lead changes). For example, for a group of four aircraft flying in a single line (e.g., an in-line formation), the third and fourth aircraft in the line may switch places.

The flying formation is directed by a designated flight leader (e.g., a team lead). The flight leader must have knowledge of the current structure of the flight formation in order to give formation change instructions to other aircraft within the group (e.g., to a wingman or a tactical lead). It is also important for the flight leader to know when these instructions to the other aircraft have been followed through.

The efforts to keep aircraft within a flying formation is referred to as station keeping. On of the most common approaches for station keeping within a flying formation is to maintain visual contact, wherein the flight leader can directly visualize wingmen within the formation and then give commands for wingmen that will maintain the flying formation. However, certain formations are difficult to ascertain from visual inspection, particularly those formations where aircraft are directly behind the flight leader, or are staggered in such a way where an aircraft adjacent to the flight leader blocks the view of another aircraft in formation. Environmental conditions may also create problems for visualization of a flying formation. For example, fog, rain, or darkness may prevent a flight leader from visualizing a wingman. In this disclosure, a display for an aircraft cockpit is described that is capable of displaying a representative view of a flying formation (i.e., a synoptic). The display shows any formation configuration changes by an aircraft within the formation and tracks the aircraft's movements during formation change in real-time. The display is also interactive, allowing a flight leader to make suggested formation changes on the display, which are then carried out and tracked.

FIG. 1 is a diagram illustrating an example environment 100 of an aircraft display 110 (e.g., a primary flight display) that includes a formation display 120 displayed in the corner of the aircraft display 110, in accordance with one or more embodiments of the disclosure. In some embodiments, the formation display 120 in incorporated into the aircraft display (e.g., as in a picture in picture (PIP) display as shown in FIG. 1). In some embodiments, the formation display 120 is a stand-alone display.

The formation display 120 and/or the aircraft display 110 may include any type of aircraft display 110 known in the art including but not limited to a synthetic vision system (SVS), a head-up display (HUD) or a head-mounted display (HMD). For example, the aircraft display 110 may be an SVS display, wherein the formation display 120 is incorporated into the SVS display.

For formation displays 120 that are incorporated into an aircraft display 110, the information displayed by the portion of the aircraft display 110 that is not incorporated by the flying portion display 120 may be any aircraft display information known in the art. For example, the aircraft display 110 may be an SVS display with the formation display 120 taking up the lower left corner of the aircraft display 110, with other portions of the aircraft display 110 displaying the land terrain 130 overlaid with primary flight display (PFD) symbology 140. It should be known that the aircraft display may display other types of flight information. Therefore, the above description should not be interpreted as a limitation of the present disclosure, but as an illustration.

In some embodiments, the formation display 120 is moveable within the aircraft display 110. For example, the formation display 120 may be moved from the lower left corner of the aircraft display 110 to the upper right corner of the aircraft display 110. The movement of the formation display 120 may be executed through any type of input known in the art. For example, the formation display 120 may be toggled through different sections of the aircraft display 110 through a key on a keyboard. In another example, the aircraft display 110 may be touch sensitive, allowing a finger movement to select the formation display 120 to be selected by a finger-touch to the aircraft display 110, then dragged to another part of the aircraft display 110. In some embodiments, the formation display 120 may be added to or removed from the aircraft display 110 or other displays as needed.

In the case of a touchscreen display, those skilled in the art should recognize that a large number of touchscreen displays may be suitable for implementation in the present invention. For instance, the one or more displays 126 may be integrated with a touchscreen interface, such as, but not limited to, a capacitive touchscreen, a resistive touchscreen, a surface acoustic based touchscreen, an infrared based touchscreen, or the like. In a general sense, any touchscreen display capable of integration with the display portion of a display device is suitable for implementation in the present invention.

In some embodiments, the size of the formation display 120 may be adjusted. Any size of the formation display 120 relative to the size of the aircraft display 110 is possible. For example, the formation display 120 may be maximized to cover an entire quadrant of the aircraft display 110. In another example, the formation display 120 may be minimized on the aircraft display 110.

The formation display 120 may include any type of display device known in the art. For example, formation display 120 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like.

Figure 2:
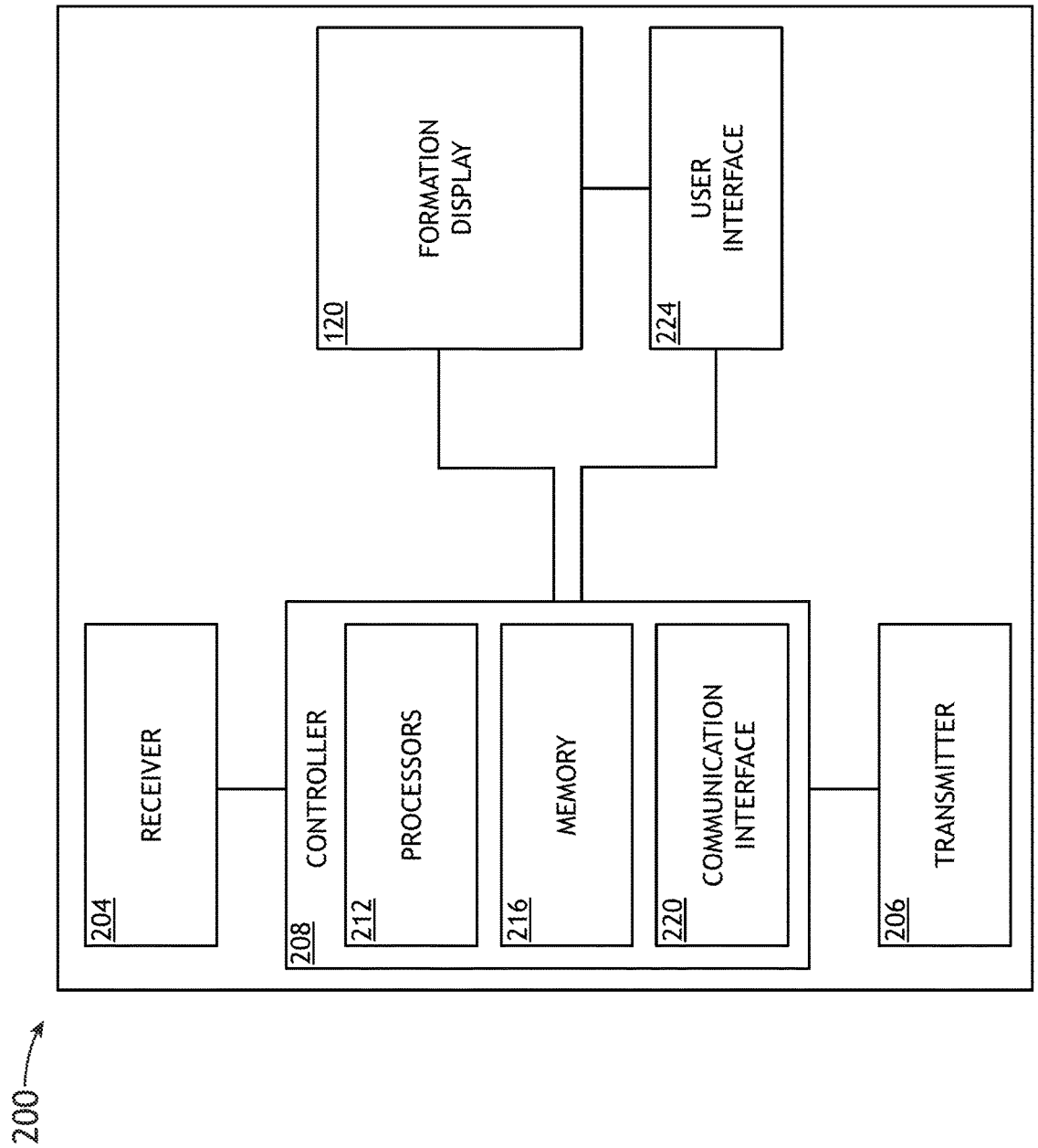
FIG. 2 is a block diagram illustrating a formation monitoring system 200 in accordance with one or more embodiments of the disclosure.

FIG. 2 is a block diagram illustrating a formation monitoring system 200 in accordance with one or more embodiments of the disclosure. In some embodiments, the formation monitoring system includes a receiver 204. The receiver 204 receives positioning signals from one or more aircraft in the flying formation. The signals may be configured as any positioning signal known in the art including but not limited to a global positioning signal (GPS), a doppler navigational system signal, or a dead reckoning signal. For example, the receiver 204 may receive GPS signals from another aircraft, allowing the formation monitoring system 200 to determine the relative distance between the two aircraft.

In some embodiments, the formation monitoring system includes a transmitter 206. The transmitter 206 transmits signals from the formation monitoring system to other componentry of one or more aircraft. For example, the transmitter 206 may transmit a signal to an aircraft adjacent to the transmitting aircraft commanding the adjacent aircraft to move to a specific point within the flying formation. The transmitter may use any type of wireless transmission signal known in the art including but not limited to radio (e.g. RF) signals, Wi-Fi signals, 5G signals, and the like. Those skilled in the art will recognize that a wide variety of transmitting and receiving devices may be used without departing from the spirit and scope of the present disclosure.

The formation monitoring system 200 may include one or more controllers 208. The one or more controllers 208 may include one or more processors 212, memory 216, and a communication interface 220. The memory 216 may store one or more sets of program instructions. The one or more processors 212 may be configured to execute the one or more sets of program instructions to carry out one or more of the various steps described throughout the present disclosure. In some embodiments, the one or more controllers 208 includes or is coupled to the receiver 204 and/or transmitter 206.

The one or more controllers 208 may be coupled (e.g., physically and/or communicatively coupled) to the one or more formation displays 120. For example, the one or more controllers 208 may be coupled directly to a stand-alone formation display 120, wherein a signal received by the receiver 204 is processed by the processor 212 within the controller 208, wherein the controller 208 then transmits the processed signal to the formation display 120. In another example, the one or more controllers 208 may be coupled to the formation display 120 configured as the inset picture of a picture-in-picture display of the aircraft display 110. wherein a signal received by the receiver 204 is processed by the processor 212 within the controller 208, wherein the controller 208 then transmits the processed signal to the aircraft display 110, wherein the portion of the aircraft display 110 designated as the formation display 120 displays the flying formation.

The one or more controllers 208 may also be configured to receive a signal from one or more user interfaces 224 described herein. For example, the user interface 224 may be configured as a keyboard, wherein an input from the keyboard may generate a command signal that is sent to the controller 208 and transmitted to another aircraft via the transmitter 206. In another example, the formation display 120 itself may be configured as a touch-sensitive user interface 224, wherein an aircraft depicted on the formation display 120 is selected for a command to move to another location within the formation, the signal being sent directly from the formation display 120 to the controller 208. The user interface 224 may include any user input device known in the art as described herein.

The one or more processors 212 may include any one or more processing elements known in the art. In this sense, the one or more processors 212 may include any microprocessor device configured to execute algorithms and/or program instructions. In general, the term "processor" may be broadly defined to encompass any device having one or more processing elements, which execute a set of program instructions from a non-transitory memory medium (e.g., the memory 216), where the one or more sets of program instructions is configured to cause the one or more processors 212 to carry out any of one or more process steps.

The memory 216 may include any storage medium known in the art suitable for storing the one or more sets of program instructions executable by the associated one or more processors 212. For example, the memory 216 may include a non-transitory memory medium. For instance, the memory 216 may include, but is not limited to, a read-only memory (ROM), a random-access memory (RAM), a magnetic or optical memory device (e.g., disk), a magnetic tape, a solid-state drive, and the like. The memory 216 may be configured to provide display information to the display device (e.g., the formation display 120). In addition, the memory 216 may be configured to store user input information from a user input device. The memory 216 may be housed in a common controller housing with the one or more processors 212. The memory 216 may, alternatively or in addition, be located remotely with respect to the spatial location of the processors 212, or the one or more controllers 208. For example, the one or more processors 212 and/or one or more controllers 208 may access a remote memory 216 accessible through a network (e.g., wireless, and the like) via one or more communication interfaces 220.

The one or more communication interfaces 220 may be operatively configured to communicate with components of the one or more controllers 208. For example, the one or more communication interfaces 220 may be configured to retrieve data from the one or more processors 212 or other devices, transmit data for storage in the memory 216, retrieve data from storage in the memory 216, and so forth. The one or more communication interfaces 220 may also be communicatively coupled with the one or more processors 212 to facilitate data transfer between components of the one or more tracking system controllers 208 and the one or more processors 212. It should be noted that while the one or more communication interfaces 220 is described as a component of the one or more controllers 208, one or more components of the one or more tracking system communication interfaces 220 may be implemented as external components communicatively coupled to the one or more tracking system controllers 208 via a wired and/or wireless connection. The one or more tracking system controllers 208 may also include and/or connect to one or more user interfaces 224 (e.g., input/output (I/O) devices). In some embodiments, the one or more communication interfaces 220 includes or is coupled to the receiver 204, the transmitter 206, the formation display 120, or any combination thereof.

The one or more communication interfaces 220 may be operatively configured to communicate with the one or more user interfaces 224. The one or more controllers 208 and the one or more user interfaces 224 may be separate components (e.g., have separate housings and/or separate chassis). It is noted herein, however, that the one or more controllers 208 and the one or more user interfaces 224 may be components integrated in a single housing and/or on a single chassis.

In some embodiments, the one or more controllers 208 of the formation monitoring system 200 is configured as an aircraft selector. For example, the one or more controllers may be configured so that an aircraft icon appearing on the formation display 120 representing an aircraft in the formation may be selected (e.g., designated for a particular use or function, such as to be moved across the screen of the formation display 120 to a target position). For instance, for a formation display 120 with a touchscreen, the aircraft selection may be accomplished by touching the respective aircraft icon on the screen. In another instance, the aircraft selection may be accomplished by switching through different icons via arrow keys on a keyboard. The input from either the touchscreen for the keyboard may be received by the one or more controllers 208, which processes the input, resulting in the selection of the aircraft.

In some embodiments, the one or more controllers 208 of the formation monitoring system 200 is configured as a target position selector. For example, the one or more controllers may be configured so that an aircraft icon appearing on the formation display 120 representing an aircraft in the formation, and selected by the aircraft selector, may be moved to a different portion on the screen (e.g., to a target position). For instance, for a formation display with a touchscreen, the movement of the aircraft icon to the target position may be accomplished by swiping the touchscreen with a finger from the selected aircraft icon to the target position, with the one or more controllers 208 receiving the input from the touchscreen, processing the input as a target position selection. In another instance, the movement of the selected icon to the target position may be accomplished by the use of arrow keys on a keyboard with the one or more controllers 208 receiving the input from the keyboard, processing the input as a target position selection. It should be noted that many configurations are possible for displaying, selecting, and moving an icon on a display that represents the current position or target position of an aircraft in an aircraft formation. Therefore, the above description should not be interpreted as a limitation of the present disclosure, but merely as an illustration.

In some embodiments, the formation monitoring system 200 is incorporated into a single aircraft (e.g., the leader aircraft) of the flying formation. In some embodiments, the formation monitoring system is 200 incorporated into more than one aircraft (e.g., the leader aircraft and one or more follower aircraft). In some embodiments, the formation monitoring system 200 for the leader aircraft has more functionality than the formation monitoring system 200 of the follower aircraft. For example, the formation monitoring system 200 for the leader aircraft may have aircraft selection and/or target position selection capabilities that the formation monitoring system 200 for the follower aircraft does not have. Many combinations of functions conferred to the formation monitoring system 200 of the leader aircraft and the follower aircraft are possible. Therefore, the above description should not be interpreted as a limitation of the present disclosure, but merely as an illustration.

Figure 3:
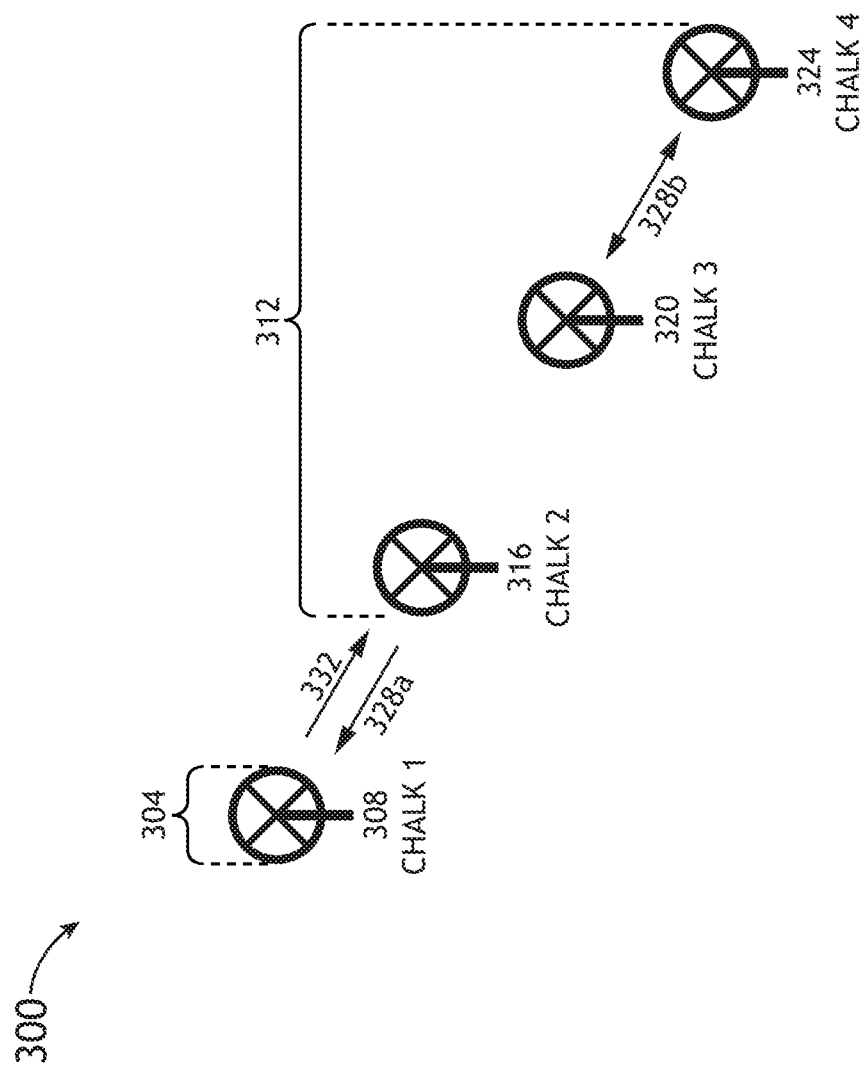
FIG. 3 is a diagram illustrating an aircraft formation 300 configured with the formation monitoring system 200, in accordance with one or more embodiments of the disclosure.

FIG. 3 is a diagram illustrating an aircraft formation 300 configured with the formation monitoring system 200, in accordance with one or more embodiments of the disclosure. In this diagram, the aircraft formation 300 is configured as an echelon right formation for rotor aircraft that includes a leader aircraft 304 (e.g., a team lead), often referred to in military terms as "Chalk 1" 308. The aircraft formation 300 also includes three follower aircraft 312 (e.g., wingmen), are often referred to in military terms as "Chalk 2" 316, "Chalk 3" 320, and "Chalk 4" 324, respectively. It should be noted that the designation of "Chalk" for identifying aircraft is a common convention used in the military and is also used here as a method to easily discern between different aircraft. As noted above, "Chalk 1" 308 is typically a leader aircraft 304 in an aircraft formation 300. Therefore, "Chalk 1" 308 and the term "leader aircraft" 304 may be used interchangeably. Accordingly, it should be noted that aircraft not designated "Chalk 1" 308 (e.g., "Chalk 2" 316, "Chalk 3" 320, and "Chalk 4" 324) are typically designated as follower aircraft 312 (e.g., wingmen). Therefore, "Chalk 2" 316, "Chalk 3" 320, and "Chalk 4" 324 and the term "follower aircraft" 312 may be used interchangeably.

In some embodiments the aircraft formation 300, the leader aircraft 304 and the follower aircraft 312 have formation monitoring systems 200 that are capable of tracking movement of aircraft within the aircraft formation 300. For example, "Chalk 2" 316 may send a position signal 328a to "Chalk 1" 308 that would be received by the receiver 204 of the formation monitoring system 200, where the relative position of "Chalk 2" 316 within the aircraft formation 300 would be displayed on the formation display 120. In this fashion, all aircraft may send position signals that are received by other aircraft and displayed on their respective formation display 120. For example, "Chalk 3" 320 and "Chalk 4" 324 may also each send each other a position signal 328b.

In some embodiments, the leader aircraft 304 may receive position signals 328 from all follower aircraft 312, calculate the relative position of all aircraft in the aircraft formation 300, then send the aircraft formation data to follower aircraft 312 to appear on their respective formation displays 120. For example, "Chalk 1" 308 may receive position signals from "Chalk 2" 316, "Chalk 3" 320, and "Chalk 4" 324, calculate the relative positions of each aircraft to each other, then send the data back to each aircraft. There are many possible combinations of transmitting and sending position signals 328 within the aircraft formation 300. For example, in some embodiments, only the leader aircraft 312 has a formation monitoring system 200 (e.g., the follower aircraft 312 only send position signals 328 to the leader aircraft 204). Therefore, the above descriptions should not be interpreted as limitations of the present disclosure, but merely as illustrations.

In some embodiments, "Chalk 1" 308 is configured to send a change-position signal 332 to one or more follower aircraft 312 (e.g., "Chalk 2" 316 in FIG. 2). For example, "Chalk 1" 308 may send a change-position signal 332 to "Chalk 2" 316, commanding the aircraft to move to a position directly behind "Chalk 1" 308 (e.g., as an initial movement within the aircraft formation 300 that is shifting from an echelon right formation to an in-line formation). After the "Chalk 2" 316 has moved to the appropriate position within the aircraft formation 300, "Chalk 1" may then send change-position signals 332 to "Chalk 3" 320 and "Chalk 4" 324 simultaneously or in sequence to move to their respective position in the in-line formation.

In some embodiments, "Chalk 1" 308 is the only aircraft within the aircraft formation 300 than can send a change-position signal 332, as "Chalk 1" 308 is the leader aircraft 304. To ensure that only "Chalk 1" 308 sends change-position signals 332, the formation monitoring systems 200 for "Chalk 2" 316, "Chalk 3" 320, and "Chalk 4" 324 may have change-position signal 332 transmit capabilities disabled by an electronic switch, an input into a software program, or some other method known in the art. However, in situations where the leader aircraft 304 needs to be reassigned during flight (e.g., due to a forced landing by "Chalk 1" 308, permitting one of the follower aircraft 312 to assume the position of leader aircraft 304) the formation monitoring systems 200 for "Chalk 2" 316, "Chalk 3" 320, and/or "Chalk 4" 324 may have the change-position 332 transmit capabilities reenabled. It should be known that one or more aircraft may not have a formation monitoring system 200 within the aircraft formation 300. For example, as mentioned above, the leader aircraft 304 may be the only aircraft within the formation that has a formation monitoring system 200. It should also be known that any aircraft within the aircraft formation 300 may have any combination of enabled features for the formation monitoring system. For example, both "Chalk 1" 308 and "Chalk 2" 316 may have the change-position 332 transmit capabilities enabled for their respective formation monitoring systems 200, whereas the formation monitoring systems for "Chalk 3" 320 and "Chalk 4" 324 do not. Therefore, the above description should not be interpreted as a limitation of the present disclosure, but merely as an illustration.

Figure 4:
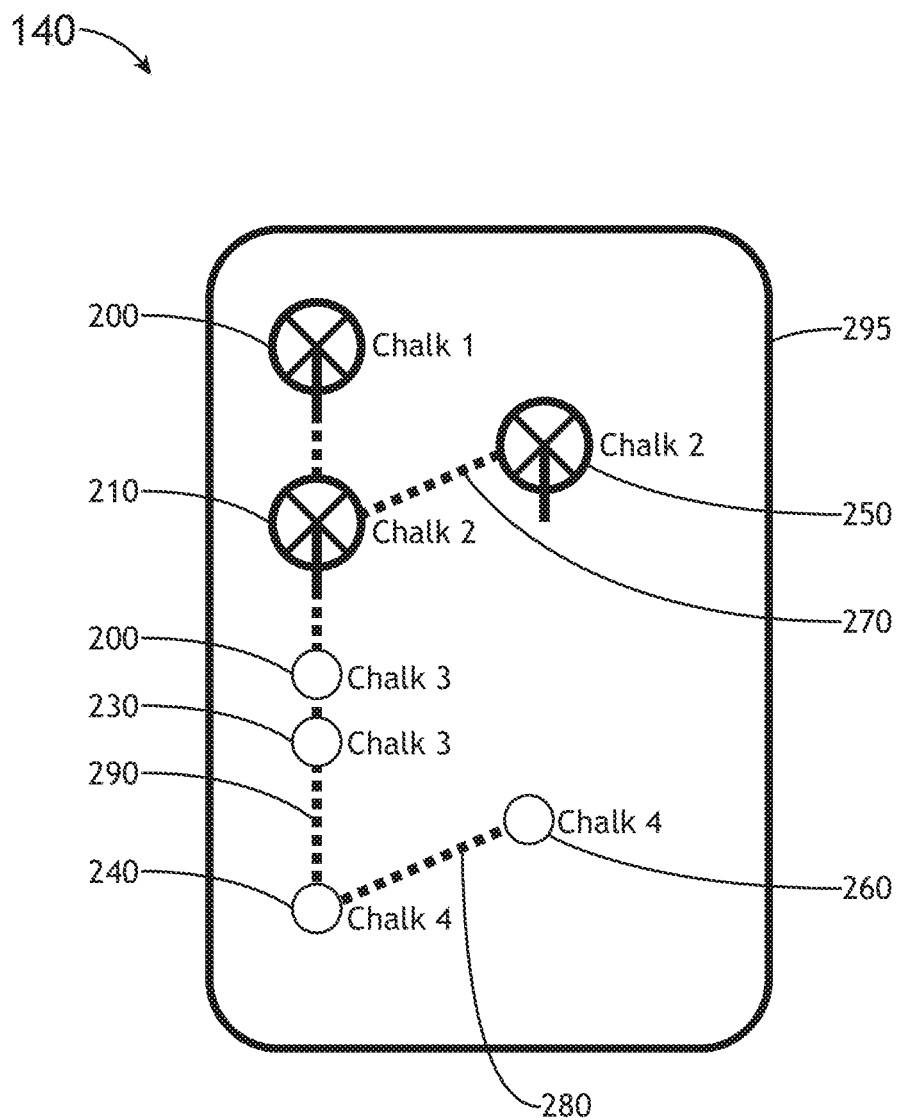
FIG. 4 is a diagram illustrating a first screenshot of the formation display from "Chalk 2", displaying an in-line aircraft formation in transition to a combat-right formation, in accordance with one or more embodiments of the disclosure.

FIG. 4 is a diagram illustrating a first screenshot 400 of the formation display 120 from "Chalk 2" 316, displaying an in-line aircraft formation in transition to a combat-right formation, in accordance with one or more embodiments of the disclosure. The first screenshot 400 is a bird's-eye view of the aircraft formation 300. The first screenshot 400 displays the leader aircraft 203 and follower aircraft 312 as presented in FIG. 3, including "Chalk 1" 308, "Chalk 2" 316, "Chalk 3" 320, and "Chalk 4" 324.

It should be known that the formation display 120 may also be considered a synoptic display. Synoptic displays are displays, typically visually graphic displays, designed to rapidly convey the state or summary of an aircraft position (e.g., without having to focus on readout). For example, the icons, lines and simple text used within the formation display 120 allow the state of the aircraft formation 300 to be quickly ascertained, allowing the pilot to spend more time focusing on other flight conditions.

Because the formation display 120 in FIG. 4 is the formation display 120 for "Chalk 2" 316, the icon representing "Chalk 2" 316 on the formation display 120 represents ownship (e.g., the representation of a particular aircraft on the formation display 120 of the particular aircraft). In some embodiments, the formation display 120 represents the ownship as a specific, or detailed, icon (e.g., the solid-lined rotor icon for "Chalk 2" 316 for the first screenshot 400 of the formation display 120 for "Chalk 2" 316). The formation display 120 may then display other non-ownship aircraft as a simple icon (e.g., a solid dot for "Chalk 3" 320). The designation of a detailed icon for the ownship assists the ownship in focusing on ownship and the relative position of ownship to other aircraft in the aircraft formation 300.

In some embodiments, the formation display 120 will display the leader aircraft 304 (e.g., "Chalk 1" 308 in the first screenshot) as a specific, or detailed, icon. For example, referring to FIG. 4, the formation display 120 may contain both a detailed icon for the leader aircraft 304 (e.g., the solid-lined rotor icon for "Chalk 1" 308) and a detailed icon for ownship (e.g., the solid-lined rotor icon for "Chalk 2" 316). In some embodiments, the icon for the leader aircraft 304 and ownship may utilize the same type of icon. In some embodiments, the icons for the leader aircraft 304 and ownship may be differentiated from each other.

In some embodiments, the formation display 120 displays association lines 402 between sequentially linked aircraft. For example, association lines 402 may be used to associate a sequential link in the hierarchy of the aircraft formation 300. For instance, association lines may be used to sequentially and associatively link "Chalk 1" 308 to "Chalk 2" 316, "Chalk 2" 316 to "Chalk 3" 320, and "Chalk 3" 320 to "Chalk 4". The association lines 402 therefore may assist the aircraft in keeping track of the specific aircraft within the aircraft formation 300.

In some embodiments, the change-position signals 332 for one or more aircraft may be presented on the formation display 120. For example, "Chalk 2" 316 may be directed by "Chalk 1" 308 to move forward and to the right to a new "Chalk 2" position 404. In another example, "Chalk 3" 316 may be directed by "Chalk 1" 308 to move back slightly to a new "Chalk 3" position 408. In another example, "Chalk 4" 316 may be directed by "Chalk 1" 308 to move forward and to the right to a new "Chalk 4" position 412. The new "Chalk 2" position 404, the new "Chalk 3" position 408, and the new "Chalk 4" position 412 are represented on the first screenshot 400 by icons that differentiate the new positions from their current positions (e.g., the current positions are solid forms, wherein the new positions are outline forms). Once "Chalk 2" 316, "Chalk 3" 320, and "Chalk 4" 324 move into their respective new position, the icon representing the new position will be replace by the icon representing the current position.

In some embodiments, the formation display 120 include path lines 416. Path lines 416 offer guidance to aircraft when moving to another position within the aircraft formation 300. For example, a path line 416a may be displayed between the current position of "Chalk 2" and the new "Chalk 2" position 404. In another example, a path line 416b may be displayed between the current position of "Chalk 4" and the new "Chalk 4" position 412. The path lines 416 may assist in preventing collisions by offering paths for multiple aircraft to take in reaching their position that do not intersect the paths of other aircraft. In some embodiments, the formation display 120 is configured so that crossed path lines 416 are either not accepted by the formation monitoring system 200 or the formation monitoring system 200 displays a warning, as crossed path lines 416 may increase a risk of collision (e.g., by two aircraft attempting to follow their path lines 416 at the same time). In some embodiments, the path lines 416 are differentiated from the association lines 402 (e.g., by a color scheme or difference in intensity). In some embodiments, the path lines 416 are removed once the aircraft reaches their respective new position. It should be noted that multiple types of designs and/or appearances of any icon (e.g., current aircraft position or new aircraft position) or any line (e.g., association line 402 or path line 416) may be displayed on the formation display 120. Therefore, the above description should not be interpreted as a limitation of the present disclosure, but merely as an illustration.

In some embodiments, the formation display 120 further includes a formation compliance indicator 420. The formation compliance indicator 420 displays on the formation display 120 the status of the flying formation 300 (e.g., whether all aircraft are at the correct position as commanded by change-position signals 332 transmitted from the leader aircraft 304 or not). For example, the formation compliance indicator 420 may be configured as a border to the formation display 120, having a dark color when the aircraft have not reached the correct relative position (e.g., as in FIG. 4). In another example, the formation compliance indicator 420 may be configured as a border to the formation display 120, having a bright color when the aircraft have reached the correct relative position. The formation compliance indicator 420 may have any shape, design or appearance. Therefore, the above description should not be interpreted as a limitation of the present disclosure, but merely as an illustration.

In some embodiments, the display of the aircraft formation 300 on the formation display 120 does not display the distance between two or more aircraft. For example, the formation display 120 may be configured for relative position (e.g., whether "Chalk 2" 316 is to the left or right of "Chalk 3" 320), rather than distinct or specific measurements. In some embodiments, the distances between aircraft of the aircraft formation 300 as displayed on the formation display 120 is an approximation. For example, the formation monitoring system 200 may be configured so that in an echelon right formation (e.g., as in FIG. 3), "Chalk 2" 316, which may be 10 meters distant from "Chalk 1" 308" and "Chalk 3" 320, which may be 40 meters distant from "Chalk 1" 308 may appear to be equally distributed on the formation display 120 (i.e., the display simplifies the display of the aircraft formation 300, being less sensitive to actual distances between aircraft). In some embodiments, the ability of the formation monitoring system to approximate the distances between aircraft is adjustable. For example, for a group of aircraft in tight formation (e.g., a grouping where all aircraft are within a 100 meter square, the movement of a wingman to a distance 1 kilometer away may appear on the formation display 120 as a movement of the wingman icon to a side of the formation display 120 opposite of the remaining aircraft formation 300, rather than disappearing off of the formation display 120 altogether (i.e., formation monitoring system 200 adjusts to ensure that all aircraft are tracked on the formation display 120, even if relative distances between aircraft are not possible).

In some embodiments, the formation monitoring system 200 has a zoom feature, allowing the formation display 120 to zoom-in or zoom-out to visualize the aircraft formation 300. For example, in a formation monitoring system 200 that is displaying the relative distances of each aircraft of a tight aircraft formation 300 on the formation display 120, the movement of a wingman considerably far from the tight formation may cause the wingman icon to leave the formation display 120, wherein an adjustment by the formation display 120 to zoom-out may cause the wingman to reappear on the display.

Figure 5:
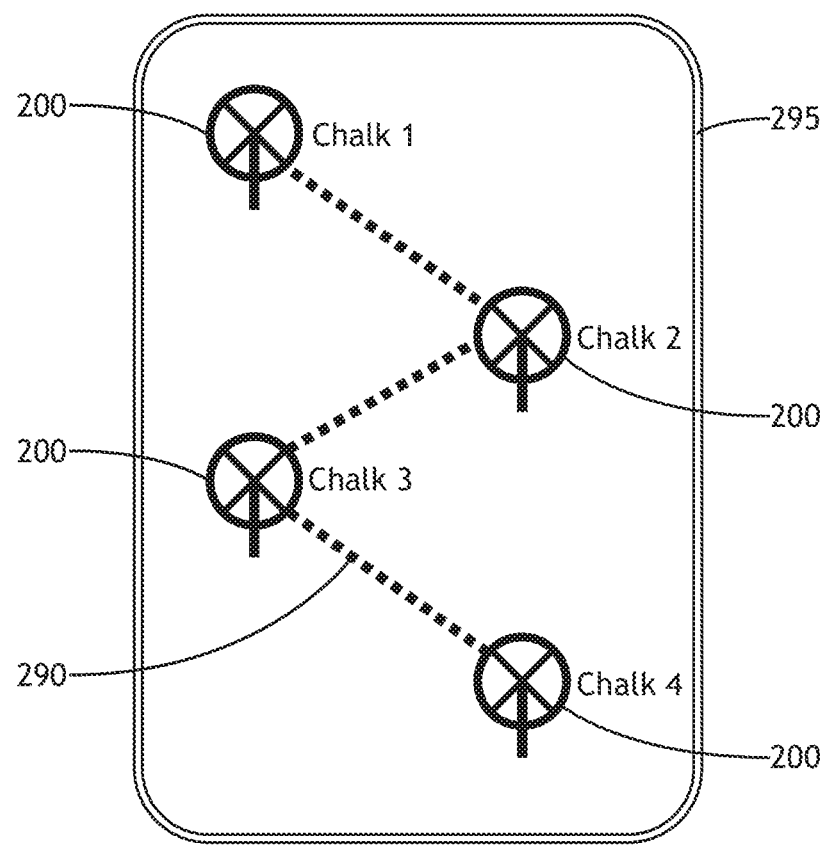
FIG. 5 is a diagram illustrating a second screenshot 500 of the formation display 120 from "Chalk 2" 316, displaying a combat right formation, in accordance with one or more embodiments of the disclosure.

FIG. 5 is a diagram illustrating a second screenshot 500 of the formation display 120 from "Chalk 2" 316, displaying a combat-right formation, in accordance with one or more embodiments of the disclosure. In the second screenshot 500, all aircraft are at the correct position (e.g., having attained a correct aircraft formation 300) as commanded by change-position signals 332 transmitted from the leader aircraft 304. The correct positioning of all aircraft invokes the formation compliance indicator 420 to switch the color of the border of the formation display from a dark color to a light color. In some embodiments, attaining a correct aircraft formation 300 also results in the change of all aircraft icons from a simple icon to a detailed icon. It should be known that many different changes in icon and/or formation display 120 appearance are possible for displaying that the correct aircraft formation 300 has been attained. Therefore, the above description should not be interpreted as a limitation of the present disclosure, but merely as an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A formation monitoring system a plurality of aircraft flying in formation comprising:
   a lead display for a leader aircraft configured to:
      display a current position of one or more aircraft of the plurality of aircraft wherein the leader aircraft is piloted by a lead pilot;
      differentially display the current position of the one or more one aircraft of the plurality of aircraft from a target position of the one or more aircraft of the plurality of aircraft; and
      indicate when the one or more aircraft of the plurality of aircraft have moved to the target position;
   a lead controller communicatively coupled to the lead display, configured to:
      receive a position signal from one or more follower aircraft of the plurality of aircraft;
      calculate the relative position of the one or more follower aircraft of the plurality of aircraft; wherein the relative positions of the one or more follower aircraft of the plurality of aircraft are displayed on the lead display; and
      determine a target position for one of the one or more follower aircraft;
   a lead user interface communicatively coupled to the lead controller, wherein the lead pilot can input at least one of a target position signal or a reassignment signal;
   a lead transmitter communicatively coupled to the lead controller configured to transmit the target position signal and a reassignment signal to the one or more follower aircraft of the plurality of aircraft;
   a follow display for the one or more follower aircraft, wherein the follower aircraft is piloted by a follow pilot; and
   a follow controller communicatively coupled to the follow display configured to:
      receive the target position signal; and
      receive the reassignment signal, wherein upon receiving the reassignment signal, the follower controller is reassigned as a lead controller;
   a follow user interface communicatively coupled to the follow controller, where upon the follow controller receiving the reassignment signal, is configured to receive a second target position signal input from the follow pilot; and
   a follow transmitter communicatively coupled to the follow controller configured to transmit a second target position signal to another aircraft of the plurality of aircraft.

2. The system of claim 1, further comprising:
   an aircraft selector configured to select one of the one or more follower aircraft of the plurality of aircraft displayed on the display;
   a target position selector configured to select a target position on the display for the one or more follower aircraft selected by the aircraft selector.

3. The system of claim 1, wherein the lead display is further configured to differentially display at least one of the leader aircraft or an ownship from the plurality of aircraft.

4. The system of claim 1, wherein the lead display is further configured to indicate when all aircraft of the plurality of aircraft are in the target position.

5. The system of claim 1, wherein the lead display is further configured to indicate a path from the current position of or more or the plurality of aircraft to the target position of the one or more of the plurality of aircraft.

6. The system of claim 1, wherein the lead display is further configured to display an approximation of the flight formation.

7. The system of claim 1, wherein the lead display is configured as a portion of a primary flight display.

8. A formation monitoring system for a plurality of aircraft flying in formation comprising:
   a lead display for a leader aircraft of the plurality of aircraft configured to:
      display a current position of one or more aircraft of the plurality of aircraft;
      differentially display the current position of the one or more one aircraft of the plurality of aircraft from a target position of the one or more aircraft of the plurality of aircraft; and
      indicate when the one or more aircraft of the plurality of aircraft have moved to the target position, wherein the leader aircraft is piloted;
   an aircraft selector for the leader aircraft of the plurality of aircraft configured to select the one or more aircraft of the plurality of aircraft displayed on the lead display;
   a target position selector for the leader aircraft of the plurality of aircraft configured to select a target position on the lead display for the one or more aircraft of the plurality of aircraft selected by the aircraft selector;
   a lead controller for the leader aircraft of the plurality of aircraft, configured to:
      receive a current position signal from the one or more aircraft of the plurality of aircraft;
      calculate the current position of the one or more aircraft of the plurality of aircraft; wherein the current position of the one or more aircraft of the plurality of aircraft are displayed on the lead display; and
      calculate the target position of the one or more aircraft of the plurality of aircraft, wherein the relative positions of the target positions of the one or more aircraft of the plurality of aircraft are displayed on the lead display; and
   a transmitter configured to transmit the target position signal to one or more follower aircraft of the plurality of aircraft;
   a follow display for the one or more follower aircraft, wherein the follower aircraft is piloted by a follower pilot; and
   a follow controller for the one or more follower aircraft of the plurality of aircraft configured to:

receive the target position signal from the leader aircraft;

receive a reassignment signal from the leader aircraft; and calculate the target position of the one or more follower aircraft, wherein the relative positions of the target positions of the one or more aircraft of the plurality of aircraft are displayed on the follower display, wherein upon receiving a reassignment signal, the follower controller is reassigned as a lead controller; and a follow user interface communicatively coupled to the follow controller, where upon the follow controller receiving the reassignment signal, is configured to receive a second target position signal input from the follow pilot; and a follow transmitter communicatively coupled to the follow controller configured to transmit a second target position signal to another aircraft of the plurality of aircraft.

9. The system of claim 8, wherein the follower display is further configured to differentially display at least one of the leader aircraft or an ownship from the plurality of aircraft.

10. The system of claim 8, wherein the lead display is configured as a portion of a primary flight display.

* * * * *